United States Patent [19]

Schuermann

[11] Patent Number: 5,347,280

[45] Date of Patent: Sep. 13, 1994

[54] FREQUENCY DIVERSITY TRANSPONDER ARRANGEMENT

[75] Inventor: Josef H. Schuermann, Oberhummel, Fed. Rep. of Germany

[73] Assignee: Texas Instruments Deutschland GmbH, Dallas, Tex.

[21] Appl. No.: 86,786

[22] Filed: Jul. 2, 1993

[51] Int. Cl.$^5$ .............................................. G01S 13/74
[52] U.S. Cl. .......................................... 342/42; 342/51
[58] Field of Search ...................................... 342/42, 51

[56] References Cited

U.S. PATENT DOCUMENTS

| | | | |
|---|---|---|---|
| 4,006,477 | 2/1977 | Yost, Jr. et al. | 342/51 |
| 4,471,344 | 9/1984 | Williams | 342/42 |
| 4,804,961 | 2/1989 | Hane | 342/42 |
| 5,053,774 | 10/1991 | Schuermann et al. | 342/44 |

OTHER PUBLICATIONS

Ser. No. 08/065,286, Filed May 21, 1993, by Josef Schuermann.

*Primary Examiner*—Mark Hellner
*Attorney, Agent, or Firm*—Brian C. McCormack; James C. Kesterson; Richard L. Donaldson

[57] ABSTRACT

A method of communicating between a transponder and an interrogator. The interrogator (10) transmits a wireless RF interrogation which is received by the transponder (12). The transponder (12) then transmits a wireless RF response. The wireless RF response has a first channel response centered at frequency FDX1=RF+SC, a second channel response centered at frequency FDX2=RF−SC, and a third channel response centered at frequency FDX3=SC. The third channel response is a spurious signal resulting from using a non-linear element (32) as the transponder modulator (32,34). The interrogator (10) receives this wireless RF response. The response is received in the three channels with a first circuit (82) operable to receive said first channel response, a second circuit (86) is operable to receive said second channel response, and a third circuit (86,88) is operable to receive said third channel response. A controller (102) then selects the response from one of said first, second, or third circuits (82,86,88) for demodulating. A demodulator (100) may then demodulate one the selected channel responses. Other arrangements, systems, and methods are disclosed.

18 Claims, 2 Drawing Sheets

FREQUENCY DIVERSITY TRANSPONDER ARRANGEMENT

CROSS-REFERENCE TO RELATED PATENTS

The following coassigned patent applications are hereby incorporated herein by reference:

| U.S. Pat. No./Appl. No. | Filing Date | TI Case No. |
| --- | --- | --- |
| 5,053,774 | 10/1/91 | TI-12797A |
| 08/065,286 | 5/21/93 | TI-16981 |

FIELD OF THE INVENTION

The invention generally relates to the field of Radio Frequency Identification (RFID). More specifically, the invention relates to a method and arrangement for communicating between a transponder and an interrogator, the method and arrangement employing frequency diversity.

BACKGROUND OF THE INVENTION

There is a great need for devices or apparatuses that make it possible to identify or detect regarding their presence at a predetermined location, objects that are provided with such devices or apparatuses in contactless manner and over a certain distance.

It is, for example, desirable to request contactless and over a certain distance, identifications that are uniquely assigned to an object and are stored in the device or apparatus so that, for example, the object may be identified. A determination may also be made whether a particular object exists within a given reading range. An example is also the case in which physical parameters such as the temperature and the pressure are to be interrogated directly at or within the object, without direct access to the object being possible. A device or apparatus of the type desired can, for example, be attached to an animal that can then always be identified at an interrogation point without direct contact. There is also a need for a device, which when carried by a person, permits access checking by which only persons whose responder unit returns certain identification data to the interrogation unit are allowed access to a specific area. A further example of a case in which such a device is needed is the computer controlled industrial production in which, without the intervention of operating personnel, components are taken from a store, transported to a production location and there assembled to give a finished product. In this case a device is required which can be attached to the individual components so that the components can be specifically detected in the spares store and taken therefrom. Yet another example of a case in which such a device is needed is in the field of Automatic Vehicle Identification (AVI) in which a stationary interrogator unit sends inquiries to a vehicle-born transponder for purposes of toll collection, identification, or other purposes.

It is advantageous to accomplish these applications and others with the least possible number of transmission errors between the interrogator and the transponder. Error correction codes, checksums with acknowledgements and retransmissions, and data transmission power and frequency tradeoffs are all methods that might be used in prior art systems to lessen the possibility of transmission errors.

SUMMARY OF THE INVENTION

The art of RFID systems comprises at least two primary categories of RFID systems. These two categories are full-duplex and half-duplex communication systems. An artisan practicing within either of these categories may employ one or more of a number of different modulation techniques including frequency shift keying (FSK), amplitude shift keying (ASK), phase shift keying (PSK), or one of a number of other modulation techniques known to the artisan. No matter the chosen modulation technique, in many FDX systems the transponder will transmit its response by first deriving a sub-carrier (SC) signal from the received exciter signal, then modulating a baseband data signal upon the sub-carrier (SC) and then further modulating this sub-carrier data signal onto a radio frequency (RF) signal. The actual transmitted signal will have frequency components at the RF frequency plus and minus the sub-carrier frequency (RF±SC). Typically in systems that have this modulation and therefore produce an RF sub-carrier on both sides of the RF carrier signal (RF±SC), one of the signals must be filtered in the interrogator from the RF response and about half the signal power used in generating the final modulated signal is lost. In any real modulator implementation other spurious frequency components exist. For example, in a single-ended modulator with one diode, a major frequency component also exists at the sub-carder frequency (SC). Although the above embodiment describes the case in which a transponder modulates data upon a sub-carrier and in turn upon an RF frequency, the situation could be reversed to describe a system in which the interrogator transmits to the transponder in the same way.

This invention is the first to recognize that in the field of RFID systems an artisan may employ the incidental modulation products such as mirror-type sub-carrier signals and spurious harmonic signals to overcome outside signal interference introduced into the primary communication channel. The preferred embodiment of the present invention is advantageous over prior art transponders in that it uses already existing modulation products to gain frequency diversity and improve data link integrity. The advantages of frequency diversity are gained by selecting to demodulate in the receiver the RF response channel having the greatest opportunity for error-free reception and demodulation. Alternatively, all or a number of channels might be demodulated and by using error detection codes the data from the error-free channel transmission could be chosen.

DETAILED DESCRIPTION OF THE PREFERRED EMBODIMENTS

Figure 1:
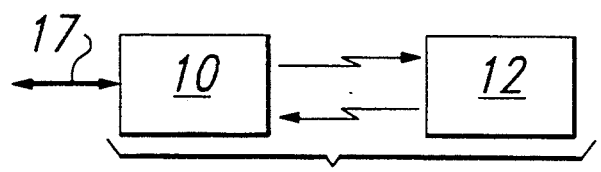
FIG. 1 shows a preferred embodiment interrogator/transponder arrangement having an interrogator in proximity to a transponder.

Referring now to FIG. 1, the transponder arrangement to be described includes an interrogator 10 and a transponder 12. The interrogator 10 is typically constructed as a stationary unit that would primarily remain in a fixed position. Alternatively, an operator might hold the interrogator 10 in his hand. The interrogator 10 will transmit an RF interrogation signal upon receipt of a user input, or by an automated command such as by computer control. This interrogator 10 also has the capacity of receiving responsive RF signals from the transponder 12, and for detecting information contained in such responsive signals. Accommodation for interrogator 10 to communicate with a host computer might be accomplished via data bus 17, such that the interrogator unit 10 might receive commands from the host computer or transmit data to and from the host computer.

Figure 2:
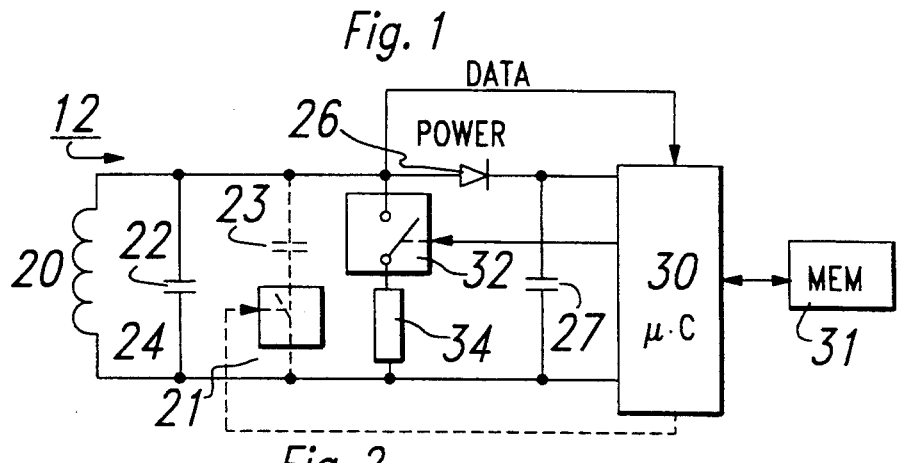
FIG. 2 shows a block diagram of a preferred embodiment full duplex transponder.

FIG. 2 shows a block diagram of a preferred embodiment full duplex transponder 12. The transponder has a resonant circuit 24, which preferably comprises a coil 20 and a capacitor 22. The powering signal or RF interrogation signal is received from the interrogator 10 on resonant circuit 24. A carrier is formed in the resonant circuit 24, preferably with a frequency equal to that of the RF interrogation signal. This carrier is then rectified by diode 26. A capacitor 27 is connected across the rectified power signal to the transponder controller 30. The resonant circuit 24 may be further operable to receive data from the interrogator 10, although the invention described herein may be used with read-only or read/write systems. Preferably, the transponder controller 30 will derive a sub-carrier signal, whose frequency is a sub-multiple of the powering signal, by dividing the powering signal. Alternatively, the transponder 12 might employ a local oscillator (LO) to independently generate a sub-carrier frequency. The sub-carrier frequency may be used to generate a baseband response signal having data transitions with a frequency of the sub-carrier frequency. The baseband response signal is then sent to switch 32, which modulates the carrier with the sub-carrier data signal. Switch 32 is optionally in series with a resistor 34. By opening or closing switch 32, the powering signal is amplitude modulated, with the percentage of ASK keying (percentage by which the "off" magnitude is reduced from the "on" magnitude) being determined by the value of the resistor 34. In other words, if the resistor 34 has a very small value, the modulation percentage will approach 100%, if the resistor 34 is very large, the modulation percentage will approach 0%. The nature of the non-linear switching of the carrier is such that two sidebands will be formed at FDX2=RF−SC and FDX1=RF+SC. A spurious signal will also be transmitted at the baseband or sub-carrier frequency FDX3=SC. It will be later explained how the preferred embodiment of the present invention uses these spurious signals advantageously. Although the method of modulating the carrier has been described as ASK, FSK could be used by having two dividers in the transponder 12 for dividing the powering or RF interrogation signal into two submultiples and allowing one of the submultiples or frequencies to indicate a first data value and another of the submultiples to indicate a second data value. The preferred embodiment of the present invention will apply to either of the above-mentioned modulation methods, or others.

For a read/write system the transponder controller 30 can store data received in the interrogation message, or initiate one of a number of actions. Particularly, the transponder controller 30 may store data received in the interrogation message in a transponder memory 31. The controller 30 can also retrieve data from the memory 31. In an AVI system this data may comprise information regarding the current balance of money that is kept on the transponder 12 so that an interrogator can inquire whether a vehicle carrying a transponder 12 may be allowed to pass the toll plaza. Upon receipt of the interrogation message, the transponder 12 can initiate such actions as, for example, a self-test routine or a responsive communication. When initiating a wireless RF response, the transponder controller 30 generates a response message at its output. The transponder 12 then uses switch 32 to modulate this response message upon the carrier. In the preferred embodiment transponder 12, this wireless response comprises a first channel response centered at FDX1=RF+SC, a second channel response centered at FDX2=RF−SC, and a spurious third channel response centered at FDX3=SC. The response is preferably by ASK modulation in which the switch 32 connects a damping element 34 in parallel with the antenna resonant circuit 24.

Figure 3:
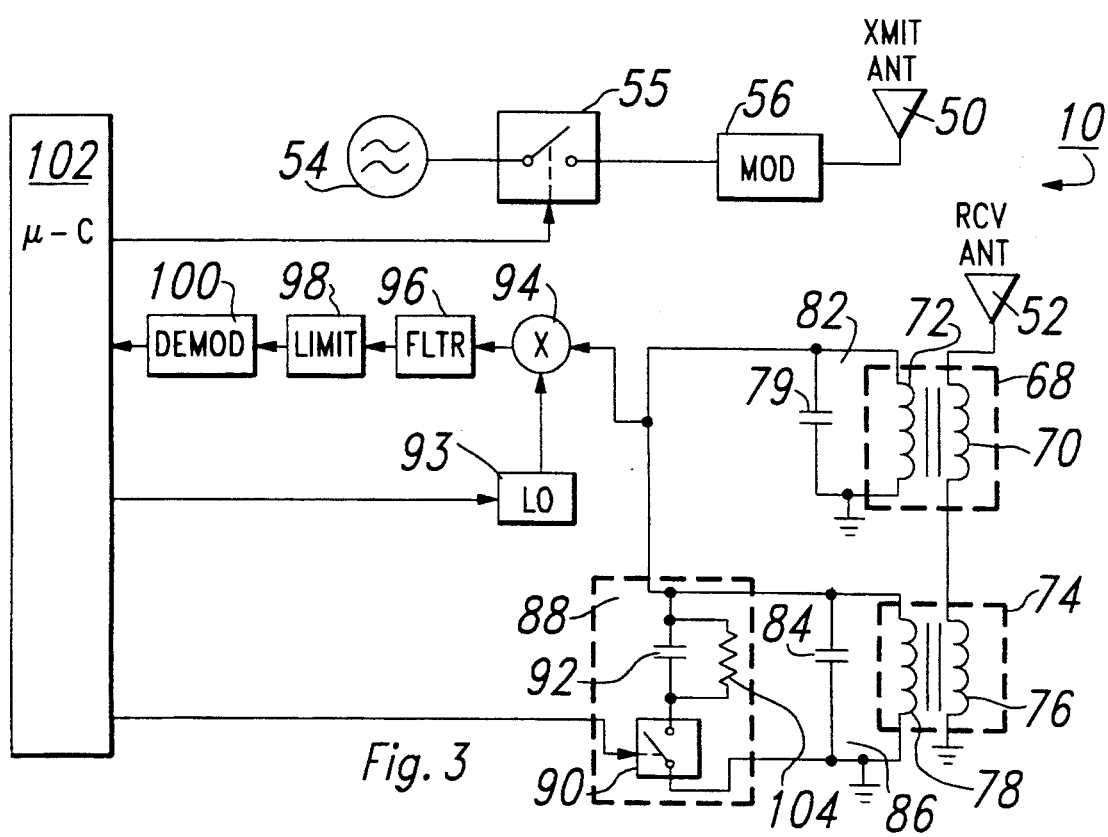
FIG. 3 is a block diagram of a preferred embodiment full duplex interrogator.

FIG. 3 is a block diagram of a preferred embodiment full duplex interrogator 10. This interrogator 10 has an interrogator transmit antenna 50 for transmitting the wireless RF interrogation and an interrogator receive antenna 52 for receiving the wireless RF response. The interrogator also contains an interrogator RF oscillator 54 for generating an uplink RF carrier. An interrogator modulator 56 receives the uplink RF carrier through an interposing switch 55 and passes this modulated carrier to the interrogator transmit antenna 50. The interrogator transmit antenna 50 then transmits the wireless RF interrogation to the transponder 12. A first transformer 68 having a first winding 70 and a second winding 72 receives the wireless RF response from the interrogator receive antenna 52. The first winding 70 of the first transformer 68 connects to the receive antenna 52. A second transformer 74 has a first winding 76 and a second winding 78. The second transformer 74 also receives the wireless RF response from the receive antenna 52. FIG. 3 shows the first winding 76 of the second transformer 74 to be connected to the receive antenna 52 serially through the first winding 70 of the first transformer 68. These transformers 68,74 could be connected in parallel, or serially in the opposite order depending on design considerations. The first transformer 68 has a first capacitor 79 in parallel with its second winding 72. The parallel combination of the second winding of the first transformer 68 and the capacitor 80 forms a first resonant circuit 82 having a first resonant frequency. Similarly, the parallel combination of the second winding 78 of the second transformer 74 with a second capacitor 84 forms a second resonant circuit 86 having a second resonant frequency. The interrogator 10 still further contains a tuning circuit 88 that may be switched to be connected in parallel with the second resonant circuit 84. Tuning circuit 88 is preferably a series combination of a switch 90 and a third capacitor 92. The closing of switch 90 causes formation of a parallel combination of the tuning circuit 88 with the second resonant circuit 86. The resulting connection of the third capacitor 92 lowers the frequency of the second resonant circuit 86 to a third resonant frequency. Tuning circuit 88 might also comprise a resistor or damping element 104 in parallel to the series combination 90,92 so that the frequency response of the second resonant circuit 86 is broadened as well as lowered so that perhaps a half-duplex FSK-modulated signal might be received thereby. The interrogator 10 still further includes a local oscillator 93, preferably selectable to oscillate at a first frequency or at a second frequency. In the embodiment described herein, the first and second frequencies are selected to be 140 and 160 kHz, respectively. For the full-duplex embodiment specified herein, the LO frequency of 140 kHz is used to translate the selected sideband of the RF±SC mirrored channels to a baseband frequency of SC or 20 kHz. To read the spurious SC channel, the LO is disabled so that no frequency translation is effected. The half-duplex reading in this embodiment uses the LO frequency of 160 kHz to shift the response signal to the baseband frequency of SC. Using a LO frequency of 120 kHz would also effect this frequency translation. A mixer 94 receives signals from the first and second resonant circuits 82,86 and from the local oscillator 92. The mixer 94 then modulates the signals from the resonant circuits 82,86 upon the signal from the local oscillator 92 and passes this modulated output signal to a filter 96. A limiter 98 then receives the output of the filter 96 and amplitude limits the signal to not exceed a pre-selected threshold. A demodulator 100 then receives the filtered, limited signal and demodulates therefrom an uplink message. The interrogator controller 102 is operable to enable transmission of the uplink RF carrier through switch 55 and to control the interrogator modulator 56 to modulate the uplink RF carrier. This modulated carder continues to the interrogator transmit antenna 50 for transmission of the wireless RF interrogation. Interrogator controller 102 is further operable to receive the uplink message from the demodulator 100 and further operable to control the switch 90 to select the resonant frequency of the second resonant circuit 86 to be the second or the third resonant frequency. The interrogator controller 102 also controls the frequency of the local oscillator 93. The interrogator controller 102 may select the appropriate response channel by evaluating which of the RF response channels has the greatest opportunity for error-free reception and demodulation. Alternatively, all or a number of channels might be demodulated. By using error detection codes the controller 102 could choose the data from the error-free channel transmission.

Figure 4:
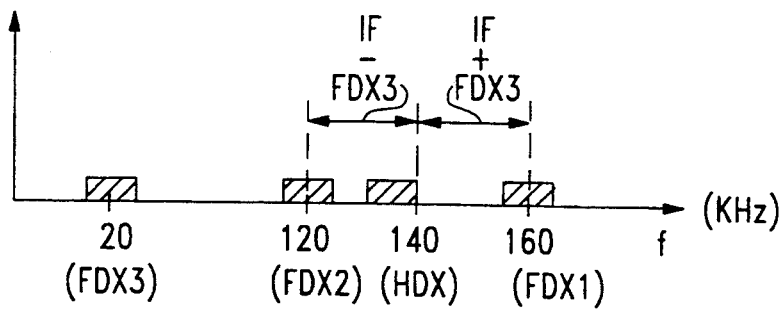
FIG. 4 is a modulation spectrum of the transponder non-linear modulating element.

While the frequency characteristics of possible RF responses are quite varied depending on the nonlinear device used to modulate the RF response upon the carrier, all real modulators have spurious output signals in addition to the sum and difference signals associated with the ideal modulator. FIG. 4 illustrates the frequency spectra for a full-duplex transponder 12 in which the modulation of the carrier in the transponder 12 by the switch 32 provides three output frequencies of interest. These three signal frequencies are centered at FDX1 and FDX2, which are the sum and difference signals respectively, and FDX3 which is a spurious output signal that is located at the sub-carrier (SC) frequency. Many other existing spurious signals are not shown in this figure. Also shown superimposed on the frequency spectra of FIG. 4 is a signal frequency that might be received from a half-duplex transponder. FIG. 4 is intended solely to show the relative frequency bands and therefore the vertical scale is not representative of any particular magnitude. In order for the interrogator 10 to work with both half and full-duplex transponders 12, it should be designed to receive the diversity signals from the full-duplex transponders and the response signals from the half-duplex transponders. In this figure, the RF carrier is 140 kHz and the sub-carrier is 20 kHz. It follows that FDX3 is centered at 20 kHz, FDX2 is centered at 120 kHz, and FDX1 is centered at 160 kHz. Referring again to FIG. 2, optional circuitry with which the transponder 12 can make a half-duplex response is shown by the dotted lines. The half-duplex response is preferably an FSK modulated response with a first and second FSK frequencies. First FSK frequency is approximately the resonant frequency of the RF carrier. Second FSK frequency is accomplished by using a switch 21 to connect a capacitor 23 in parallel with the transponder resonant circuit 24, thus lowering the frequency of the resonant circuit from the first FSK frequency to the second FSK frequency. By selectively opening and closing the switch 21 data can be modulated upon the carrier with the first FSK frequency representing a first data polarity and the second FSK frequency representing a second data polarity. For operation with half-duplex transponders, the interrogator 10 will send a half-duplex powering burst followed by a quiet time during which the switch 55 will disable transmission of power from the exciter or oscillator 54 to the antenna 50. During this time period the interrogator 10 waits for a half-duplex RF response.

Figure 5:
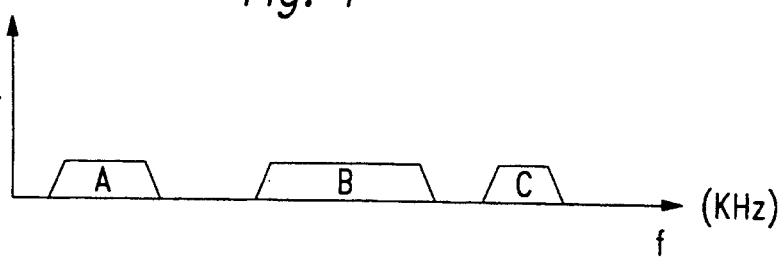
FIG. 5 is a frequency spectrum of the preselector passbands or filters of the interrogator of a preferred embodiment of the present invention.

FIG. 5 shows the pre-select filter passbands for the interrogator 10. FIG. 5 is intended solely to show the relative frequency bands and therefore the vertical scale is not representative of any particular magnitude. The "A" passband is received on the first resonant circuit 82 and has a center frequency of approximately 20 kHz to receive the spurious signal FDX3 from the full-duplex transponder 12. The "B" and "C" passbands are received on the second resonant circuit 86. When configured to receive the "C" passband, the second resonant circuit 86 has a center frequency of approximately 160 kHz to receive the sum component FDX1 of the modulator of the full-duplex transponder 12. When configured to receive the "B" passband, the interrogator 10 still further contains a tuning circuit 88 that may be switched to be connected in parallel with the second resonant circuit 84. The center frequency of the second resonant circuit 84 is now shifted to approximately 120 kHz and the second resonant circuit 84 may be damped by a resistor 104 so the bandwidth of the second resonant circuit 84 is sufficient to receive either the difference component signal FDX2 from the full-duplex transponder 12 or in an optional embodiment a response signal HDX from a half-duplex transponder. Of course, separate resonant circuits may be used for the "B" and "C" passbands, as well as for the half-duplex response signal HDX.

Figure 6:
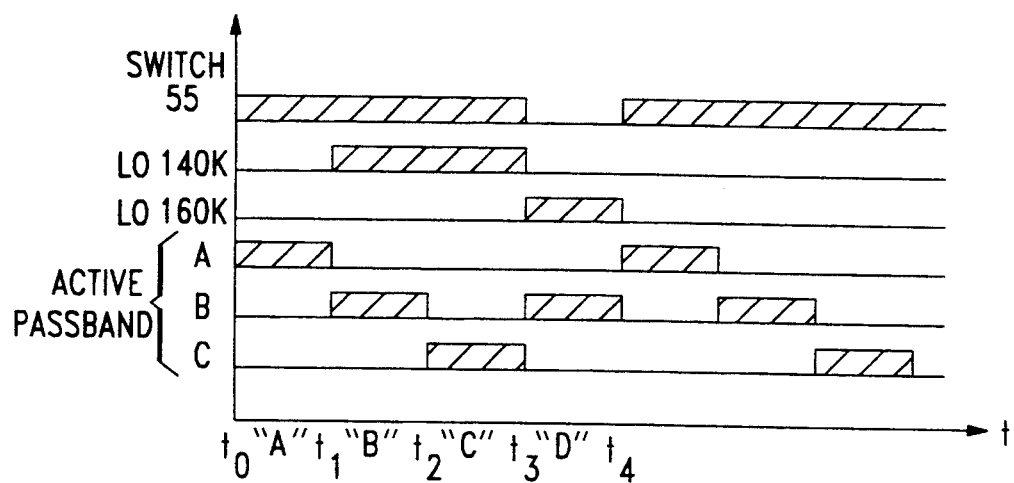
FIG. 6 is a timing diagram of a preferred protocol for channel switching for frequency diversity.

FIG. 6 is a timing diagram showing a representative algorithm that an interrogator might use to communicate with full-duplex and half-duplex transponders. Time period "A" which lasts from $t_0$ to $t_1$ allows for the reception of the spurious signal FDX3 on the first resonant circuit 82 using passband "A." During this time period switch 55 is closed to allow the interrogator to continue excitation of the full-duplex transponder 12, and switch 90 may be open or closed as any signals from passbands "B" or "C" will be filtered out. Also during time period "A" the LO 93 is disabled by the interrogator controller 102 to allow the spurious signal centered at SC to pass through to be demodulated. During time period "B" which lasts from $t_1$ to $t_2$, switch 55 remains closed so that the interrogator 10 continues to excite the transponder 12. Switch 90 is closed so the interrogator 10 may receive the signals from passband "B." Further, During time period "C" which lasts from $t_2$ to $t_3$, switch 55 remains closed so that the interrogator 10 continues to excite the transponder 12. Switch 90 is opened so the interrogator 10 may receive the signals from passband "C." As in time period "C," during time period "B," the LO 93 oscillates at 140 kHz so that the received signal can be frequency shifted to the SC frequency. During time period "D" which lasts from $t_3$ to $t_4$, switch 55 is now opened so that the interrogator 10 no longer transmits an interrogation signal. During time period "D," the LO 93 will oscillate at 160 kHz, this time so the received HDX signal can be frequency shifted to the sub-carrier (SC) frequency. Interrogator 10 may now receive a half-duplex response from half-duplex transponders 12. This cycle may be repeated numerous times with or without intermediate steps between the cycles. FIG. 6 is intended to show the relative frequency bands and therefore the vertical scale is not representative of any particular magnitude. Since the transponder 12 transmits its signal over three different frequency bands FDX1, FDX2, and FDX3, the interrogator 10 can analyze the signal received on each of these bands during time periods "A," "B," and "C," respectively. One way in which the interrogator 10 can determine which of the received signals is valid would be to use a simple error detection code such as parity or checksum codes. One or all of the received signals might indicate by its parity or checksum an error-free transmission. The interrogator 10 can simply choose whichever received signal indicates an error-free transmission. Other methods of selecting the proper received signal may be selected by the artisan, yet fall within the scope of the claims of this invention. Although the timing has been described with respect to a system having three full-duplex response channels and a single half-duplex response channels, many other embodiments are possible. Such embodiments would include systems having more or fewer full-duplex response channels and systems having no half-duplex response channels. Still other embodiments would include systems having more than one half-duplex response channel.

The sole table, below, provides an overview of the embodiments and the drawings:

TABLE

| Drawing Element | Generic Team | Preferred or Specific Team | Alternte Terms |
| --- | --- | --- | --- |
| 10 | Interrogator | | Reader |
| 12 | Transponder | | Responder |
| 17 | Data Bus | | |
| 20 | Inductor | | Coil |
| 21 | Switch | FSK Modulating Switch | |
| 22 | Capacitor | | |
| 23 | Capacitor | FSK Modulating Capacitor | |
| 24 | Resonant Circuit | Antenna Resonant Circuit | Tuned Circuit, Parallel Resonant Circuit |
| 26 | Rectifier | Diode | |
| 27 | Capacitor | Power Filtering Capacitor | |
| 30 | Controller | Transponder Controller | Microprocessor, Control Logic, Microcontroller |
| 31 | Memory | Transponder Memory | |
| 32 | Switch | ASK Modulating Switch | |
| 34 | Damping Element | ASK Modulating Resistor | |
| 50 | Antenna | Xmit Antenna | |
| 52 | Antenna | Rcv Antenna | |
| 54 | Oscillator | Oscillator | Exciter |
| 55 | Switch | Exciter Enable Switch | |
| 56 | Modulator Circuit | Interrogator Modulator | |
| 68 | Transformer | First Transformer | |
| 70 | First Winding | | |
| 72 | Second Winding | | |
| 74 | Transformer | Second Transformer | |
| 76 | First Winding | | |
| 78 | Second Winding | | |
| 79 | Capacitor | First Capacitor | |
| 82 | Resonant Circuit | First Resonant Circuit | SC Resonant Circuit |
| 84 | Capacitor | Second Capacitor | |
| 86 | Resonant Circuit | Second Resonant Circuit | RF ± SC Resonant Circuit |
| 88 | Tuning Circuit | | |
| 90 | Switch | Tuning Switch | |
| 92 | Capacitor | Third Capacitor | Tuning Capacitor |
| 93 | Oscillator | Local Oscillator | LO |
| 94 | Frequency Shifter | Mixer | |
| 96 | Filter | Band-pass Filter | |
| 98 | Limiter | Amplitude Limiter | |
| 100 | Demodulator | ASK Demodulator | FSK Demodulator, ASK/FSK Demodulator, PSK Demodulator |
| 102 | Controller | Interrogator Controller | Control Unit, Microprocessor |
| 104 | Damping Element | Resistor | |

A few preferred embodiments have been described in detail hereinabove. It is to be understood that the scope of the invention also comprehends embodiments different from those described, yet within the scope of the claims.

For example, "microcomputer" is used in some contexts to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in full-duplex transponder arrangements or half-duplex transponder arrangements. Frequency shift keying (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An interrogator/transponder system, said system comprising:
   a) a transponder operable to receive a wireless RF interrogation; and to transmit a wireless RF response, said response comprising a first channel response centered at frequency FDX1=RF+SC and a second channel response centered at frequency FDX2=RF−SC; and
   b) an interrogator, said interrogator having
      i. a transmit antenna for transmitting said wireless RF interrogation,
      ii. a receive antenna for receiving said wireless RF response,
      iii. a first circuit in electrical communication with said receive antenna and operable to receive said first channel response,
      iv. a second circuit in electrical communication with said receive antenna and operable to receive said second channel response,
      v. a controller in electrical communication with said first and second circuits and operable to select one of said responses therefrom, and
      vi. a demodulator for receiving said selected response and for demodulating an uplink message therefrom.

2. The system of claim 1 wherein said transponder generates said wireless RF response by modulating a carrier using a non-linear element such that said first and second channels are the mirror image signals associated with an ideal modulator and a third channel response is a spurious signal centered at frequency FDX3 and formed as a result of using said non-linear element modulator.

3. The system of claim 2 and further comprising a third circuit in electrical communication with said receive antenna and operable to receive said third channel response.

4. The system of claim 3 wherein said transponder comprises:
   a) an antenna for receiving a wireless RF interrogation of frequency RF;
   b) an antenna resonant circuit for deriving a carrier of frequency RF from the power in said wireless RF interrogation;
   c) a controller for receiving said carrier of frequency RF and for deriving therefrom a sub-carrier of frequency SC by dividing said carrier; said controller further for generating a response message, said response message being generated at said sub-carrier frequency, SC; and
   d) a modulator for modulating said response message upon said carrier to form a wireless response, said modulator being a non-linear circuit element such that said modulated response message has a first channel response centered at frequency FDX1=RF+SC, a second channel response centered at frequency FDX2=RF−SC, and a third channel response centered at frequency FDX3=SC.

5. The system of claim 4 wherein said modulator is a series combination of a switch and a damping element connected in parallel to said antenna resonant circuit.

6. The system of claim 5 wherein said damping element is a short circuit such that the closing of the switch forms a low impedance path across the antenna resonant circuit.

7. The system of claim 1 wherein said first and second channels are full-duplex channels whereby said RF interrogation may be made simultaneously to said RF response.

8. The system of claim 7 wherein said interrogator is further operable to send a half-duplex powering burst followed by a quiet time during which the exciter of the interrogator is no longer active and the interrogator waits for a half-duplex RF response.

9. The system of claim 1 wherein said interrogator further comprises additional circuits in electrical communication with said receive antenna and operable to receive additional channel responses which are formed as a result of the non-linearity of said transponder modulator.

10. The system of claim 1 wherein said controller is further operable to analyze each of said first, second and third channel responses to determine which of said responses has the greatest opportunity for error-free signal reception and demodulation.

11. The system of claim 1 wherein said controller selects each of said channels individually for demodulation of an uplink message by said demodulator and checks each of said demodulated messages for errors.

12. The system of claim 1 wherein said controller uses parity bits to check for said errors.

13. The system of claim 1 wherein said receive antenna and said transmit antenna are the same antenna.

14. The system of claim 1 wherein said RF interrogation comprises a downlink message.

15. The system of claim 1 wherein said second circuit is a parallel resonant circuit and said third circuit is said second circuit in electrical communication with a tuning circuit.

16. An interrogator/transponder system, said system comprising:
   a) a transponder, said transponder having
      i. an antenna for receiving a wireless RF interrogation of frequency RF, ii. an antenna resonant circuit for deriving a carrier of frequency RF from the power in said wireless RF interrogation, iii. a divider for deriving a sub-carrier of frequency SC from said carrier of frequency RF, iv. a demodulator for receiving said wireless RF interrogation from said antenna resonant circuit and for providing a demodulated interrogation message at an output, v. a controller for receiving said demodulated RF interrogation message at its input and for generating a response message at its output, said response message being generated at said sub-carrier frequency, SC, vi. a modulator for modulating said response message upon said carrier to form a wireless response, said modulator being a non-linear circuit element such that said modulated response message has a first channel response centered at frequency FDX1=RF+SC, a second channel response centered at frequency FDX2=RF−SC, and a third channel response centered at frequency FDX3=SC; and b) an interrogator, said interrogator having i. a transmit antenna for transmitting said wireless RF interrogation, ii. a receive antenna for receiving said wireless RF response, iii. an RF oscillator for generating an uplink RF carrier, iv. a modulator which receives said uplink RF carrier and which passes this modulated carrier to said transmit antenna for transmitting said wireless RF interrogation, v. a first transformer having a first and a second winding, said first transformer for receiving said wireless RF response from said receive antenna, said first winding of said first transformer being connected to said receive antenna, vi. a second transformer having a first and a second winding, said second transformer also for receiving said wireless RF response from said receive antenna, said first winding of said first transformer being connected to said receive antenna, vii. a first capacitor in parallel with said second winding of said first transformer, the parallel combination thereof forming a first resonant circuit having a resonant frequency of approximately FDX3=SC whereby said third channel response of frequency FDX3 can be received thereby, viii. a second capacitor in parallel with said second winding of said second transformer, the parallel combination thereof forming a second resonant circuit having a resonant frequency of approximately FDX1=RF+SC whereby said first channel response of frequency FDX1 can be received thereby, ix. a tuning circuit in parallel with said second resonant circuit, said tuning circuit comprising the series combination of a third capacitor and a switch whereby when said switch is closed, the parallel combination of said second winding of said second transformer and said second and third capacitors lowers the frequency of said second resonant circuit to have a resonant frequency of approximately FDX2=RF−SC whereby said second channel response of frequency FDX2 can be received thereby, x. a local oscillator, said local oscillator being enabled to oscillate at frequency RF when the first and second channel responses are to be demodulated and being not enabled when said third channel response is to be demodulated, xi. a mixer for receiving the signals from said first and second resonant circuits, and from said local oscillator, said mixer for shifting the frequency of said signals to a common baseband, xii. a filter for receiving the output of said demodulator and providing a filtered output signal, xiii. a limiter for receiving said filtered output signal and for amplitude limiting said filtered output to form a filtered, limited signal, xiv. a demodulator receiving said filtered, limited signal and demodulating therefrom an uplink message, and xv. a controller operable to provide data to said modulator for modulation of said uplink RF carder, said controller further operable to receive said uplink message from said demodulator and to enable the operation of said local oscillator.

17. A method of communicating between a transponder and an interrogator, said method comprising the steps of:

a) transmitting by said interrogator a wireless RF interrogation;

b) receiving in a transponder a wireless RF interrogation;

c) transmitting by said transponder a wireless RF response, said response comprising a first channel response centered at frequency FDX1=RF+SC, a second channel response centered at frequency FDX2=RF−SC, and a third channel response centered at frequency FDX3=SC;

d) receiving by said interrogator said wireless RF response, wherein a first circuit is operable to receive said first channel response, a second circuit is operable to receive said second channel response, and a third circuit is operable to receive said third channel response, e) selecting by a controller the response from one of said first, second, or third circuits, and f) demodulating an uplink message from said selected response by a demodulator.

18. The method of claim 17 wherein said controller further analyzes each of said first, second and third channel responses to determine which of said responses has the greatest opportunity for error-free signal reception and demodulation.

* * * * *